(12) United States Patent
Gueneau et al.

(10) Patent No.: US 7,985,443 B2
(45) Date of Patent: Jul. 26, 2011

(54) SELF-CLEANING LIGHTING DEVICE

(75) Inventors: Lethicia Gueneau, Vincennes (FR);
Christian Bouigeon, Sablonnieres (FR);
Hugues Tariel, Coulommiers (FR);
Mauricette Rondet, Vitry sur Seine (FR)

(73) Assignee: Saint-Gobain Glass France, Courbevoie (FR)

( * ) Notice: Subject to any disclaimer, the term of this patent is extended or adjusted under 35 U.S.C. 154(b) by 895 days.

(21) Appl. No.: 10/585,136

(22) PCT Filed: Jan. 7, 2005

(86) PCT No.: PCT/FR2005/050009
§ 371 (c)(1),
(2), (4) Date: Nov. 1, 2007

(87) PCT Pub. No.: WO2005/070540
PCT Pub. Date: Aug. 4, 2005

(65) Prior Publication Data
US 2009/0175026 A1    Jul. 9, 2009

(30) Foreign Application Priority Data
Jan. 7, 2004   (FR) ..................... 04 00100

(51) Int. Cl.
*B05D 5/06* (2006.01)
(52) U.S. Cl. ............... 427/162; 427/163.1; 427/164; 427/165; 427/166; 427/167; 427/255.31
(58) Field of Classification Search ............ 427/162, 427/163.1, 163.4, 255.31, 164, 165, 166, 427/167
See application file for complete search history.

(56) References Cited

U.S. PATENT DOCUMENTS

| | | | |
|---|---|---|---|
| 5,939,194 A | | 8/1999 | Hashimoto et al. |
| 6,242,752 B1 * | | 6/2001 | Soma et al. ............ 250/504 R |
| 6,824,290 B2 * | | 11/2004 | Noda et al. ............ 362/155 |
| 7,744,555 B2 * | | 6/2010 | DiMauro et al. ........... 604/8 |
| 2002/0147108 A1 | | 10/2002 | Sato et al. |
| 2009/0114928 A1 * | | 5/2009 | Messere et al. ............ 257/88 |
| 2010/0204040 A1 * | | 8/2010 | Nakano et al. ............ 502/305 |

FOREIGN PATENT DOCUMENTS

| | | |
|---|---|---|
| EP | 0 816 466 | 1/1998 |
| EP | 0 887 104 | 12/1998 |
| EP | 1 066 878 | 1/2001 |
| JP | 07-111104 | 4/1995 |
| JP | 09-237511 | 9/1997 |
| WO | 94/07807 | 4/1994 |
| WO | 97/10186 | 3/1997 |
| WO | 01/40705 | 6/2001 |

OTHER PUBLICATIONS

Tode, Ryohei, et al., "Photocatalytic Decomposition of Water on Double-Layered Visible Light-Responsive TiO2 Thin Films Prepared by a Magnetron Sputtering Deposition Method." Catal Lett (2010) 135:pp. 10-15.*
Shang, Jing, et al., "Solid-State, Planar Photoelectrocatalytic Devices Using a Nanosized TiO2 Layer". Citation unknown. 2007, pp. 1-5.*
Wu, et al., "Methyl orange adsorption by microporous and mesoporous $TiO_2$-$SiO_2$ and $TiO_2$-$SiO_2$-$Al_2O_3$ composite xerogels", Composite Interfaces, vol. 11, No. 2, pp. 205-212, 2004.
Yang, et al., "Block Copolymer Templating Syntheses of Mesoporous Metal Oxides with Large Ordering Lengths and Semicrystalline Framework", Chem. Mater, vol. 11, pp. 2813-2826, 1999.
Gao, et al., "Titania-silica as catalysts: molecular structural characteristics and physico-chemical properties", Catalysis Today, vol. 51, pp. 233-254, 1999.
Grosso, et al., "A First Insight in the Mechanisms Involved in the Self-Assembly of 2D-Hexagonal Templated $SiO_2$ and $TiO_2$ Mesostructured Films During Dip-Coating", Journal of Sol-Gel Science and Technology, vol. 26, pp. 561-564, 2003.
Kwon, et al., "Preparation and Characterization of $TiO_2$-$SiO_2$ nanocomposite thin films", Ceramics International, vol. 29, pp. 851-856, 2003.

* cited by examiner

*Primary Examiner* — Bret Chen
(74) *Attorney, Agent, or Firm* — Oblon, Spivak, McClelland, Maier & Neustadt, L.L.P.

(57) ABSTRACT

The invention relates to a self-cleaning lighting device comprising a light source and a wall, which permits a portion of at least the radiation emitted by said source to pass therethrough and which is covered, over a portion of at least one of its two faces, by a photocatalytically active layer. The invention is characterized in that under the weakest illumination conditions, the photocatalytic activity of said layer is high enough for degrading and reducing organic soilings into easily eliminable particles that do not adhere to said layer, and/or for conferring a hydrophilic character to this layer. The invention also relates to a method for producing the aforementioned device, a translucent wall provided for this device, and to the use of the device for lighting tunnels, public lighting, airport runway lighting, indoor lighting or for headlamps or indicator lights of transportation vehicles.

16 Claims, No Drawings

SELF-CLEANING LIGHTING DEVICE

The present invention relates to a lighting device of the type exposed to atmospheric pollution, especially organic pollution.

Document EP 0 887 104 B1 describes the general principle of a $TiO_2$ coating on the translucent protective cover for a lighting device. $TiO_2$, especially when crystallized in anatase form, exhibits photocatalytic activity, that is to say the ability to catalyze radical oxidation reactions under UV radiation. Hydrocarbon residues, for example coming from automobile exhaust gases, may be degraded in this way into smaller particles that are less adherent and less fatty than the initial hydrocarbons.

Moreover, $TiO_2$ has a hydrophilic character. Water, when deposited on $TiO_2$, is in the form of a film able to guarantee the best distribution, dissolution and then elimination, by hydrodynamic effect, of the abovementioned degradation products.

As known for example from EP 850 204 B1, there is therefore synergy between the radical oxidation catalysis and the hydrophilicity of $TiO_2$, in order to produce a self-cleaning effect, this being very key when the coated substrate is glazing, since the best optical transparency quality is thus lastingly preserved.

EP 887 104 B1 mentions broad families of processes for preparing $TiO_2$. It mentions in more detail the heat treatment at 650-800° C. for 30 s to 5 min—a conventional toughening treatment for a sheet of glass—of a titanium alkoxide solution.

The aim of such a process is to produce $TiO_2$ mainly crystallized in anatase form, with a view to applying it to translucent covers for protecting tunnel lamps.

The inventors have also studied this field of application and realized that the effectiveness of a self-cleaning coating on tunnel lamps depends in particular on the position in the tunnel (distance from the ends of the tunnel) and on the nature of the light source, in particular owing to the fact that this source may or may not have a UVA component (315-400 nm wavelength). It is essentially these wavelengths that are capable of activating $TiO_2$ crystallized in anatase form.

Near one end of a tunnel, the amount of residual UVA may be sufficient for photocatalytically activating $TiO_2$. Moreover, the source of illumination of the lamp itself may have a UVA component, one portion of which, sufficient to activate $TiO_2$, can be transmitted through the translucent cover as far as its surface in contact with the atmosphere of the tunnel. This is the case in fluorescent-type lamps.

However, when the distance from the two ends of the tunnel is large and when the light emitted by the lamp has little or no UVA component, which is the case for sodium lamps for example, the aforementioned process for producing the $TiO_2$ does not provide a product with sufficiently high photocatalytic activity for the desired and useful self-cleaning effect to be observed, unless particular operating conditions, not disclosed in this production process, so allow.

To solve this problem, one subject of the invention is a lighting device comprising a light source and a wall that lets at least a portion of the radiation emitted by said source pass therethrough, said wall being coated over at least a portion of at least one of its two faces with a photocatalytically active layer, characterized in that, under the lowest illumination conditions, the photocatalytic activity of said layer is high enough to degrade the organic soiling and to reduce it to particles that do not adhere to said layer and can be easily removed therefrom, and/or to give said layer a hydrophilic character.

The expression "lowest illumination conditions" refers here to the fact that the photocatalytically active layer receives UVA neither from the atmosphere external to the lighting device nor from the lighting source that has little or no UVA component.

The inventors have thus formed lamps provided, on their surface in contact with the ambient atmosphere in particular, with a layer of photocatalytic activity so high that, even under low illumination at wavelengths other than that of UVA, such as visible light or UVB, they have the property of degrading fatty adherent hydrocarbon vapors into fine nonadherent dust particles that can be removed by an aerodynamic effect (very little draft) or hydrodynamic effect (liquid spray).

This very high photocatalytic activity is also manifested by a pronounced hydrophilic character. This property, also called wettability, observed within the context of the invention, also results from the fact that any soiling present is less fatty and consists of products resulting from the radical degradation of the soiling present on a lamp not coated with the active layer.

The wall of the lighting system takes any standard form: substantially plane, curved to a greater or lesser extent or even having sharp angles, depending on what the materials and the manufacturing processes employed allow.

According to a minimum photocatalytic activity criterion, well above that exhibited by most known photocatalytic $TiO_2$ layers, the layer according to the invention preferably comprises $TiO_2$ and its photocatalytic activity, under radiation of wavelength centered on 365 nm and of 50 $W/m^2$ power, causes the rate of disappearance of palmitic acid deposited on said layer, determined by haze measurement and expressed relative to the amount of $TiO_2$, is at least 10 $nm \cdot h^- \cdot \mu g^{-1} \cdot cm^2$.

In a first main embodiment of the invention, the coated wall of the lighting device is essentially made of glass, especially toughened glass such that an area measuring 50×50 mm breaks into at least 40 fragments (R 43 standard for toughened automotive glass), in particular more than 60 fragments. This choice guarantees maximum transmission of the emitted light, and also public safety should the glass shatter. This safety aspect would be jeopardized by glass shattering into a small number of fragments, which, as is known, goes hand in hand with the edges of said fragments being sharper.

In this first embodiment, the problem of alkali metals (especially Na) in the glass migrating to its surface, which is liable to occur when it is heated—for example by the lighting source—must be taken into consideration. As dealt with in document EP 850 204 B1, alkali metals affect the photocatalytic activity of a $TiO_2$ coating. A first means of remedying this consists, according to the invention, in that at least in one region of its surface directed toward said photocatalytically active layer, the total content of alkali and alkaline-earth metal oxides of said glass wall does not exceed 15% by weight, while the sodium oxide content does not exceed 10% by weight.

Soda-lime-silicate glass thus dealkalized is obtained by treatments using various techniques, especially electrical techniques such as corona discharge, as described in documents WO 94/07806-A1 and WO 94/07807-A1.

In the second main embodiment of the invention, said wall is essentially made of a transparent plastic or several plastics in combination. Such plastics that are suitable are, for example, polycarbonate, polymethyl methacrylate, polypropylene, polyurethane, polyvinyl butyral, polyethylene terephthalate, polybutylene terephthalate, an ionomer resin such as ethylene/(meth)acrylic acid copolymer neutralized by a polyamine, a cycloolefin copolymer, such as an ethylene/norbornene or ethylene/cyclopentadiene copolymer, a polycarbonate/polyester copolymer, an ethylene/vinyl acetate copolymer, and similar copolymers, whether by themselves or as blends.

Of course, temperatures for preparing the photocatalytic layer of around 650° C. or higher are incompatible with deposition on these plastics. The highly active layer according to the invention may on the contrary be produced at more moderate temperature, not exceeding 250° C. for example, or even at ambient temperature. It is therefore possible to coat plastics therewith, without in any way affecting them.

In each of the two aforementioned main embodiments, a particularly silicon-based layer is advantageously inserted between said wall and said photocatalytically active layer. This interlayer is:

when the wall is made of glass, a barrier layer preventing diffusion of alkali metals from the glass, constituting a second solution to the abovementioned problem, namely an interlayer made of silica and derivatives, such as silicon oxycarbide or oxynitride, SiOX with x<2 produced by thermal CVD on a ribbon of float glass supported by a bath of molten tin, by a vacuum technique, such as magnetron sputtering, or by a sol-gel method, etc.; and when the wall is made of a plastic, a scratch-resistant layer, essential in this case, namely an SiOCH(N) interlayer by plasma-enhanced chemical vapor deposition (PECVD), electron beam evaporation, magnetron sputtering, ion-enhanced CVD, ion beam CVD, etc.

Since the antisoiling effect correlates, as is known, with the thickness of the active layer for a given photocatalytically active composition, this thickness is advantageously between 100 and 1000 nm and the surface density of the $TiO_2$ layer is between 1 and 100, preferably 2 and 65 $\mu g/cm^2$.

To fully benefit from the synergy between the ability to catalyze radical oxidation reactions and the hydrophilic character, the lighting device according to the invention advantageously includes means for spraying liquid onto the active layer, something which is already provided on the headlights of certain automobiles, for example in the absence of a photocatalytic layer.

Preferably, the translucent wall of the lighting device is coated at least on its face opposite said light source with the photocatalytically active layer. It is the problem of the contamination of the external surfaces of the lighting device that is the most important (atmospheric pollution) that it is intended to solve in a preferential manner within the context of the invention.

However, if the light source is protected in an enclosure that is not sealed, that face of said wall turned toward this light source may be accessible to certain organic pollution. It is therefore not excluded for that face to be coated with a photocatalytically active layer. In this case, the proportion of the radiation from the light source capable of activating the layer is much higher than for a layer on the opposite face, the relatively large proportion of the radiation not being transmitted through the wall.

Excellent results are obtained in particular with an active layer comprising $TiO_2$ doped with Fe, Nb, Ta, Pt, Rh, Ag, Pd, Sn, Cd, W, Ce, Zr, Cu, Ru, Mo, Al, Bi, V, Co and/or Ni, optionally their oxides and/or salts, especially in particulate form with dimensions smaller than those of the $TiO_2$ particles and intimately blended or alloyed therewith.

The doping amplifies the photocatalytic effect due to titanium oxide, by increasing its absorption band and/or increasing the number of charge carriers and/or increasing the efficiency and the kinetics of the photocatalytic reactions.

The dopant may consist of small particles inserted between the titanium oxide crystallites aggregated into nanoparticles, that is to say integrated thereinto, or as small particles distributed on the external surface of the $TiO_2$ nanoparticles, or even as a thin layer coating the photocatalytically active layer.

The subject of the invention is also a process for manufacturing a lighting device as described above, in which said photocatalytically active layer is formed by a sol-gel method, by chemical vapor deposition (CVD) or atmospheric-pressure plasma-enhanced chemical vapor deposition (APPECVD), or under a vacuum or reduced pressure, especially by magnetically enhanced cathode sputtering (or magnetron sputtering).

Sol-gel methods are particularly well suited to deposition on walls of complex shape.

According to one preferred process for producing the layer of high photocatalytic activity, this is formed as a mesoporous structure by a sol-gel method, comprising:

the preparation of a liquid composition comprising at least one precursor of the essentially mineral material constituting the mesoporous structure of said layer and at least one organic structuring agent;

the precipitation of the precursor around the organic structuring agent and the growth of molecules derived from the precursor;

the addition into the liquid composition of elementary crystallites or nanoparticles of optionally doped titanium oxide, with diameters between 0.5 and 100 nm;

the application of the composition to the surface to be coated; and the elimination of the organic structuring agent, the titanium oxide crystallites being incorporated into the mesoporous structure while essentially maintaining their integrity, it being possible for several of them to be aggregated as nanoparticles therein.

Preferably, the temperature does not exceed 250° C. when carrying out this process, so as to preserve conventional toughening of glass. Thus, the step of removing the structuring agent may consist in heating to 250° C. for 2 hours, or else irradiating with UVA at ambient temperature.

Other subjects of the invention are:

a wall based on glass or plastic intended for the lighting device described above; and the application of the lighting device above to the lighting of a tunnel, to public lighting or the lighting of airport runways, or to headlights or signal lights for transport vehicles, whether on land, on water or in the air, especially motor vehicles, and also to interior lighting.

The invention will be illustrated by the example below.

EXAMPLE

Deposited on glass, still in the form of a ribbon of float glass, was a sublayer based on silicon oxycarbide, denoted for convenience as SiOC (without prejudging the actual oxygen and carbon contents in the coating). This sublayer was deposited by CVD using Si precursors, and in particular an $SiH_4$/ethylene mixture diluted in nitrogen, using a nozzle placed above and transversely to the ribbon of float glass of a flat glass production line, in the float chamber, while the glass was still at a temperature of about 550 to 600° C. The coating obtained had a thickness of about 50 nm and a refractive index of about 1.55. Specimens of the float glass provided with its alkali-barrier SiOC sublayer thus obtained were cut to the dimensions of a tunnel lamp cover. These specimens were washed, rinsed, dried and exposed to an ozone/UV treatment for 45 minutes.

For glass subjected to a bending/toughening treatment, an alternative to the SiOC sublayer by CVD in the float chamber, was an $SiO_2$ layer subsequently by a sol-gel method on bent/toughened glass, practically cold or at a temperature not exceeding 250° C., allowing the benefit of the toughening to be maintained.

This layer was in fact equivalent to the CVD SiOC layer in the alkaline-metal diffusion barrier function.

A coating of mesoporous structure was formed on the sublayer.

The liquid treatment composition was obtained by mixing, in a first step, 22.3 ml of tetraethoxysilane, 22.1 ml of absolute ethanol, and 9 ml of HCl in demineralized water (1.25 pH) in a flask until the solution became clear and then by placing the flask in a water bath at 60° C. for 1 h.

In a second step, added to the sol obtained above was a solution of a polyoxyethylene/polyoxypropylene block copolymer sold by BASF under the brand name Pluronic PE6800 (8000 molecular weight) in proportions such that the PE6800/Si molar ratio was 0.01. This was obtained by mixing 3.78 g of PE6800, 50 ml of ethanol and 25 ml of the sol.

The $TiO_2$ nanoparticles crystallized in anatase form with a size of about 50 nm were added to the liquid composition thus obtained, just before being deposited on a specimen. The deposition was carried out by spin coating with an initial amount of 3 ml per specimen. (Other equivalent deposition techniques are dip coating, spray coating, laminar coating, roll coating, flow coating, etc.).

The specimens were then heated for 2 hours at 250° C. The pores of the coating thus formed had a size of 4-5 nm.

The Ti/Si atomic ratio was confirmed by SIMS analysis of the mesoporous coating to be exactly identical to that of the initial liquid composition. SIMS analysis also confirmed that the nanoparticles were distributed uniformly in the three dimensions of the coating.

The thickness t of the coatings in nm was measured from SIMS profiles and SEM micrographs.

The amount of $TiO_2$ in $\mu g/cm^2$ was determined by X-ray fluorescence.

The photocatalytic activity was measured in the following manner:

1. test carried out on about 15 $cm^2$ of coating;
2. the specimen was weighed and the thickness of the substrate, the light transmission TL and the haze Td (both these two in %) were measured;
3. a solution of palmitic acid (8 grams of acid per 1 liter of chloroform) was deposited by spraying, with a glass/spray distance of 20 cm, on a vertical substrate, in 3 to 4 successive passes;
4. the specimen was weighed after deposition of the palmitic acid in order to determine the thickness in nanometers of the palmitic acid deposited;
5. the light transmission $T_L$ and the haze $T_d$ after deposition were measured;
6. the change in haze as a function of the irradiation time under UVA with an intensity of about 50 $W/m^2$ were measured;
7. the time after which the haze decreased by 50% was determined graphically (this time was called $T_{1/2}$ (disappearance)); and
8. the photocatalytic activity of the coating was determined as the rate of disappearance of palmitic acid v (in nm/h), defined in the following manner:

$v$(nm/h)=(palmitic acid thickness (nm))/($2 \times T_{1/2}$ (disappearance)(h)).

The value of the photocatalytic activity relative to the amount of $TiO_2$ in the coating was also measured. Finally, the optical properties, namely light reflection $R_L$ and haze $T_d$ (in %) were measured.

The Ti/Si ratio was equal to 1.

The following results were obtained:

t=454 nm;

$TiO_2$=33.3 $\mu g/cm^2$;

v=620 nm/h;

v/$TiO_2$=18 $nm \cdot h^{-1} \cdot \mu g^{-1} \cdot cm^2$;

$R_L$=9.7%;

$T_d$=0.3%.

Two sodium tunnel lamps, radiating practically no UVA, and two fluorescent lamps, were equipped with a glass cover treated according to the example.

Two lamps of each of the aforementioned types were equipped with an untreated float glass cover.

A lamp of each type with a treated glass cover and with an untreated glass cover were placed separately for 84 days, on the one hand, in the entrance region of a tunnel and, on the other hand, in the central region of the tunnel, receiving virtually no or very little UVA from the external atmosphere.

Care was taken when removing the treated glasses to ensure that they were not exposed to UVA not present in the tunnel.

The lamps were not permanently powered, the tunnel rarely being illuminated for 100% of the time, but 9 h 30 min per day on average.

The treated glasses were perfectly wetting at installation.

The covers were examined in the following manner:
visual observations on the pollution;
removal, on a cloth, of the dust deposited on a surface 5 $cm^2$ in area: this revealed the state of fouling and allowed the "easy clean" function to be assessed; and
evaluation of the hydrophilicity, by depositing a few drops of deionized water onto the surface of the glass.

The results are given in the tables below:

TABLE 1

Appraisal of the two types of lamp in the entrance region

| Entrance | Fluorescent lamp | | Sodium lamp | |
| --- | --- | --- | --- | --- |
| region | Treated | Untreated | Treated | Untreated |
| Visual observations | Little dust | Presence of dust causing a haze | Little dust | Presence of dust causing a haze |
| Cloth test | Little dirt | Dirty | Little dirt | Dirty |
| Hydrophilicity | Wetting | Nonwetting | Wetting | Wetting |

TABLE 2

Appraisal of the two types of lamp in the central region

| | Fluorescent lamp | | Sodium lamp | |
| --- | --- | --- | --- | --- |
| Central region | Treated | Untreated | Treated | Untreated |
| Visual observations | Presence of dust causing a | Presence of dust causing a | Presence of dust causing a haze. No very pronounced | |

TABLE 2-continued

Appraisal of the two types of lamp in the central region

| Central region | Fluorescent lamp | | Sodium lamp | |
|---|---|---|---|---|
| | Treated | Untreated | Treated | Untreated |
| | haze | greater haze than on treated glass | difference between the 2 glasses | |
| Cloth test | Very dirty, but "easily removable" dust | Very dirty, but impression of "fat" | Very dirty in both cases No very pronounced difference between the 2 glasses | |
| Hydrophilicity | Wetting | Nonwetting | Wetting | Nonwetting |

The difference in behavior in the entrance region may be explained by:
- the presence of UVA that enters the tunnel and allows the $TiO_2$ layer to be more effective; and
- pollution less confined than in the central region.

In the central region, contamination of the glasses, even when treated, is observed, and the hydrophilic character is maintained in the case of the treated glasses. However, in the case of treated luminaires containing fluorescent lamps (UVA emission and therefore activation of the layer), pollution is present in the form of dry dust which can be very easily detached from the surface. On the untreated glasses, highly adherent fatty pollution was observed.

The inventors have therefore provided lamps that remain clean and/or are easy to clean under the lowest illumination and highest pollution conditions.

The invention claimed is:

1. A process for manufacturing a lighting device comprising a light source and a wall that lets at least a portion of the radiation emitted by a source pass therethrough, said wall having a coating over at least a portion of at least one of its two faces of a photocatalytically active layer, wherein under the lowest illumination conditions, the photocatalytic activity of said layer degrades the organic soiling and reduces said soiling to particles that do not adhere to said layer and can be easily removed therefrom, and/or to give said layer a hydrophilic character, wherein said process comprises forming said photocatalytically active layer as a mesoporous structure by a sol-gel method comprising:
preparing a liquid composition comprising at least one precursor of an essentially mineral material constituting the mesoporous structure of said layer and at least one organic structuring agent;
precipitating the precursor around the organic structuring agent and growing molecules derived from the precursor;
adding into the liquid composition elementary crystallites or nanoparticles of optionally doped titanium oxide, with diameters between 0.5 and 100 nm;
applying the composition to the surface to be coated; and
eliminating the organic structuring agent, the titanium oxide crystallites being incorporated into the mesoporous structure while essentially maintaining their integrity.

2. The process of claim 1, wherein the lighting device comprises $TiO_2$ and has photocatalytic activity, under radiation of wavelength centered on 365 nm and of 50 W/m² power, which causes the rate of disappearance of palmitic acid deposited on said layer, determined by haze measurement and expressed relative to the amount of $TiO_2$, to be at least $10 \text{ nm} \cdot \text{h}^{-1} \cdot \mu\text{g}^{-1} \cdot \text{cm}^2$.

3. The process of claim 1, wherein said wall is essentially made of glass.

4. The process of claim 3, wherein the glass of the wall for an area measuring 50×50 mm breaks into at least 40 fragments.

5. The process of claim 4, wherein the glass of the wall for an area measuring 50×50 mm breaks into more than 60 fragments.

6. The process of claim 3, wherein at least in one region of a surface of the device directed toward said photocatalytically active layer, the total content of alkali and alkaline-earth metal oxides of said glass wall does not exceed 15% by weight, while the sodium oxide content does not exceed 10% by weight.

7. The process of claim 3, wherein a barrier layer, preventing the diffusion of alkali metals from the glass, or a scratch-resistant layer, is inserted between said wall and said photocatalytically active layer.

8. The process of claim 1, wherein said wall is essentially made of at least one transparent plastic.

9. The process of claim 1, wherein said photocatalytically active layer has a thickness of between 100 and 1000 nm and contains 1 to 100 µg/cm², of $TiO^2$.

10. The process of claim 9, wherein the device includes means for spraying liquid onto said photocatalytically active layer.

11. The process of claim 9, wherein said photocatalytically active layer has a thickness of between 2 to 65 µg/cm² of $TiO_2$.

12. The process of claim 1, wherein said wall is coated at least on its face opposite said light source with said photocatalytically active layer.

13. The process of claim 1, wherein said layer comprises $TiO_2$ doped with Fe, Nb, Ta, Pt, Rh, Ag, Pd, Sn, Cd, W, Ce, Zr, Cu, Ru, Mo, Al, Bi, V, Co and/or Ni, optionally their oxides and/or salts.

14. The process as claimed in claim 1, which is carried out at temperatures not exceeding 250° C.

15. The process of claim 1, wherein at least some of the titanium oxide crystallites aggregate as nanoparticles in the mesoporous structure.

16. The process of claim 1, wherein said layer comprises $TiO_2$ doped with Fe, Nb, Ta, Pt, Rh, Ag, Pd, Sn, Cd, W, Ce, Zr, Cu, Ru, Mo, Al, Bi, V, Co and/or Ni, optionally their oxides and/or salts, in particulate form with dimensions smaller than those of the $TiO_2$ particles and blended or alloyed therewith.

* * * * *